United States Patent
Mijares et al.

(10) Patent No.: US 10,240,896 B2
(45) Date of Patent: Mar. 26, 2019

(54) TUBE TO BULKHEAD BONDED JOINT DESIGN

(71) Applicant: Raytheon Company, Waltham, MA (US)

(72) Inventors: Orlando L. Mijares, Tucson, AZ (US); Keith A. Elkins, Tucson, AZ (US); Jack W. Reany, Corona De Tuc, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 643 days.

(21) Appl. No.: 14/656,128

(22) Filed: Mar. 12, 2015

(65) Prior Publication Data

US 2016/0265877 A1 Sep. 15, 2016

(51) Int. Cl.

| F41F 3/042 | (2006.01) |
|---|---|
| F16L 37/00 | (2006.01) |
| F41F 3/06 | (2006.01) |
| F41F 3/065 | (2006.01) |
| F16B 11/00 | (2006.01) |
| F41F 3/073 | (2006.01) |

(52) U.S. Cl.
CPC ............ *F41F 3/042* (2013.01); *F16B 11/006* (2013.01); *F16L 37/008* (2013.01); *F41F 3/06* (2013.01); *F41F 3/065* (2013.01); *F41F 3/073* (2013.01)

(58) Field of Classification Search
CPC .... F41F 3/042; F41F 3/06; F41F 3/065; F41F 3/073; F41F 3/052; F41F 3/077; F16B 11/006; F16B 11/008; B29C 66/534; B29C 57/00; F16L 41/001; F16L 41/08; F16L 41/082; Y10T 403/33; Y10T 403/38

USPC .......................... 403/265, 266, 268, 289, 290
See application file for complete search history.

(56) References Cited

U.S. PATENT DOCUMENTS

| 1,259,956 | A | * | 3/1918 | Carter | F16L 41/001 |
|---|---|---|---|---|---|
| | | | | | 122/511 |
| 2,792,962 | A | | 5/1957 | Granfelt | |
| 3,039,641 | A | * | 6/1962 | Rosan | F16L 41/082 |
| | | | | | 217/113 |
| 3,243,204 | A | * | 3/1966 | Schwab | B41L 1/22 |
| | | | | | 462/56 |
| 3,243,206 | A | * | 3/1966 | Samer | F16L 5/027 |
| | | | | | 16/2.1 |
| 3,251,267 | A | | 5/1966 | Hauser et al. | |

(Continued)

FOREIGN PATENT DOCUMENTS

| CN | 2926979 Y | 7/2007 |
|---|---|---|
| EP | 0174069 A1 | 3/1986 |

(Continued)

OTHER PUBLICATIONS

International Search Report and Written Opinion; PCT Application No. PCT/US2016/012941; dated Mar. 31, 2016; 13 pages.

*Primary Examiner* — Carib A Oquendo

(74) *Attorney, Agent, or Firm* — Cantor Colburn LLP

(57) ABSTRACT

A tube to bulkhead joint is provided. The joint includes a bulkhead defining an aperture and comprising an interior facing sidewall at the aperture, a tubular element, which is insertible into the aperture, the tubular element including an end sized to fit into the aperture and slotted to form multiple deflectable fingers, and adhesive disposable between at least the multiple deflectable fingers and the interior facing sidewall of the aperture.

20 Claims, 5 Drawing Sheets

(56) References Cited

U.S. PATENT DOCUMENTS

| | | | |
|---|---|---|---|
| 3,342,104 A | 9/1967 | Robert | |
| 3,518,359 A | 6/1970 | Trimble et al. | |
| 3,766,828 A | 10/1973 | Cords | |
| 3,988,961 A | 11/1976 | Banta | |
| 4,044,443 A | 8/1977 | Chartet | |
| 4,295,522 A | 10/1981 | Frei | |
| 4,296,669 A | 10/1981 | Debona | |
| 4,635,527 A | 1/1987 | Carrier | |
| 5,068,496 A * | 11/1991 | Favalora | F16L 5/06 174/654 |
| 5,115,711 A | 5/1992 | Bushagour | |
| 5,567,074 A * | 10/1996 | Dovak | F16L 41/08 285/3 |
| 5,847,307 A | 12/1998 | Kennedy | |
| 6,082,782 A * | 7/2000 | Bartholoma | F16L 25/0045 174/541 |
| 6,230,604 B1 | 5/2001 | Larson | |
| 6,322,282 B1 * | 11/2001 | Kussman | F16D 1/0858 403/289 |
| 6,406,068 B1 * | 6/2002 | Bartholoma | F16L 5/14 285/208 |
| 7,913,604 B2 | 3/2011 | Monteil | |
| 8,221,085 B2 | 7/2012 | Livingston | |
| 8,230,594 B1 | 7/2012 | Bossard | |
| 8,353,238 B1 | 1/2013 | Montgomery et al. | |
| 8,424,439 B2 | 4/2013 | Bailey | |
| 8,635,937 B2 | 1/2014 | Angeloff | |
| 2002/0162648 A1 | 11/2002 | Crook | |
| 2006/0242831 A1 | 11/2006 | Cesaroni | |
| 2011/0183152 A1 | 7/2011 | Lanham | |
| 2012/0055321 A1 | 3/2012 | Angeloff | |
| 2013/0320667 A1 * | 12/2013 | Cai | F16L 37/0925 285/133.21 |
| 2014/0126953 A1 * | 5/2014 | Allred, III | F16B 11/008 403/265 |
| 2016/0102784 A1 * | 4/2016 | Masters | F16L 3/2235 248/68.1 |

FOREIGN PATENT DOCUMENTS

| | | |
|---|---|---|
| EP | 0578522 A1 | 1/1994 |
| EP | 1936211 | 6/2008 |

* cited by examiner

TUBE TO BULKHEAD BONDED JOINT DESIGN

STATEMENT OF GOVERNMENT RIGHTS

This invention was made with government support under contract no. N00014-11-D-0504 awarded by the department of defense. The government has certain rights in the invention.

BACKGROUND

The present invention relates to a bonded joint and, more particularly, to a tube to bulkhead bonded joint design.

Many technological fields have needs for tubes or canisters to be joined to bulkheads. One such field involves ordinance or missile launching, in which ordinance such as a missile is launched from a launch tube provided as part of a launching system.

A launching system can be disposed as a vertical launching system (VLS) and operates by holding and firing missiles from a platform. This platform may be on a naval ship, such as surface ships and submarines, an air or ground vehicle or may be static. Each VLS platform includes a number of cells, which can hold one or more missiles ready for firing. Typically, each cell can hold a number of different types of missiles, allowing for flexibility for various missions.

The cells are often provided as tubular elements that are supported on a bulkhead. However, the tight tolerances required for achieving good structural bonded joints between tubes and bulkhead openings may cause the paste adhesive to be wiped off the faying surfaces when the tubes are inserted into the bulkhead openings or when bulkheads are inserted onto tubes. In either case, tube geometries can impede the application of pressure at bond lines to assist with bonding and can interfere with non-destructive verification of adhesive in the bond lines.

SUMMARY

According to one embodiment of the present invention, a tube-to-bulkhead joint is provided. The joint includes a bulkhead defining an aperture and comprising an interior facing sidewall at the aperture, a tubular element, which is insertible into the aperture, the tubular element including an end sized to fit into the aperture and slotted to form multiple deflectable fingers, and adhesive disposable between at least the multiple deflectable fingers and the interior facing sidewall of the aperture.

According to another embodiment, a tube-to-bulkhead joint is provided. The joint includes a bulkhead defining apertures and comprising interior facing sidewalls at each of the apertures, tubular elements respectively insertible into a corresponding aperture, each of the tubular elements comprising an end sized to fit into the corresponding aperture and slotted to form multiple deflectable fingers and adhesive disposable between at least the multiple deflectable fingers of each tubular element and the interior facing sidewalls of the each of the corresponding apertures.

According to yet another embodiment, a method of forming a tube-to-bulkhead joint is provided and includes defining an aperture in a bulkhead, sizing an end of a tubular element to fit into the aperture, slotting the end of the tubular element to form multiple deflectable fingers and disposing adhesive between at least the multiple deflectable fingers and an interior facing sidewall of the aperture.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, the following description relates to the gluing of a tube inside a close tolerance hole. Normally, when a tube is slid into a close tolerance hole or a bulkhead is slid onto a tube, glue gets wiped off and leaves an unreliable joint. However, when axial slits are formed in the tube in the bondline area, fingers are formed on the tube end that can modestly deflect. The deflection of the fingers allows the use of a hand held glue injection gun to be inserted under the fingers so that glue can be applied thoroughly. The axial slits also allow for visual verification (squeeze out) of glue in the joints while the fingers allow for the application of mechanical pressure during bonding (if needed) to achieve intimate contact.

Figure 1:
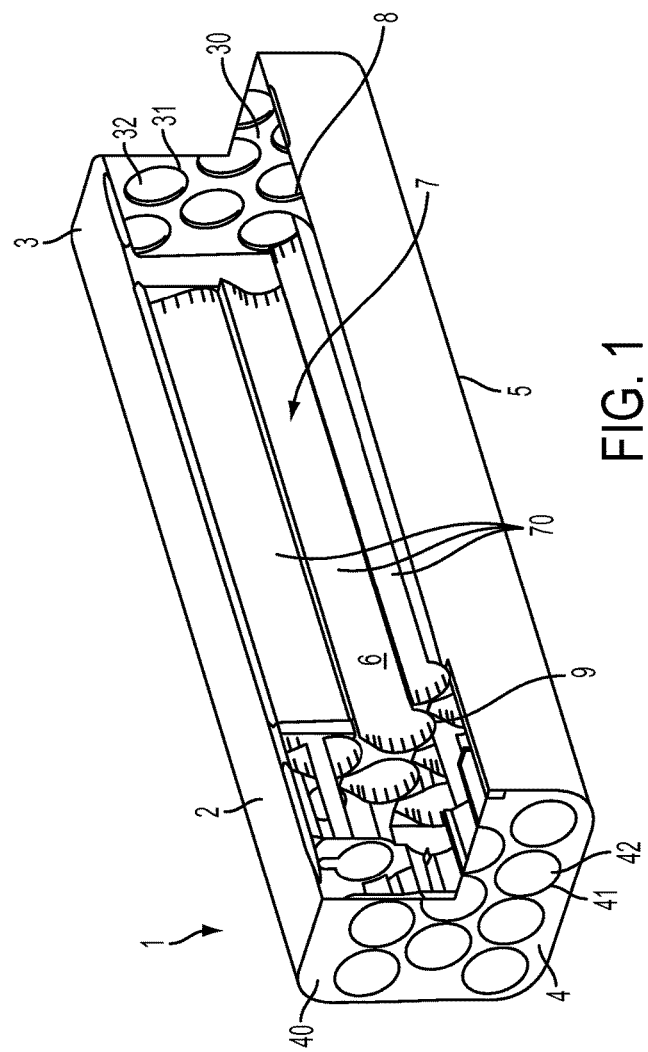
FIG. 1 is a partially cutaway isometric view of a launch tube assembly.
Figure 2:
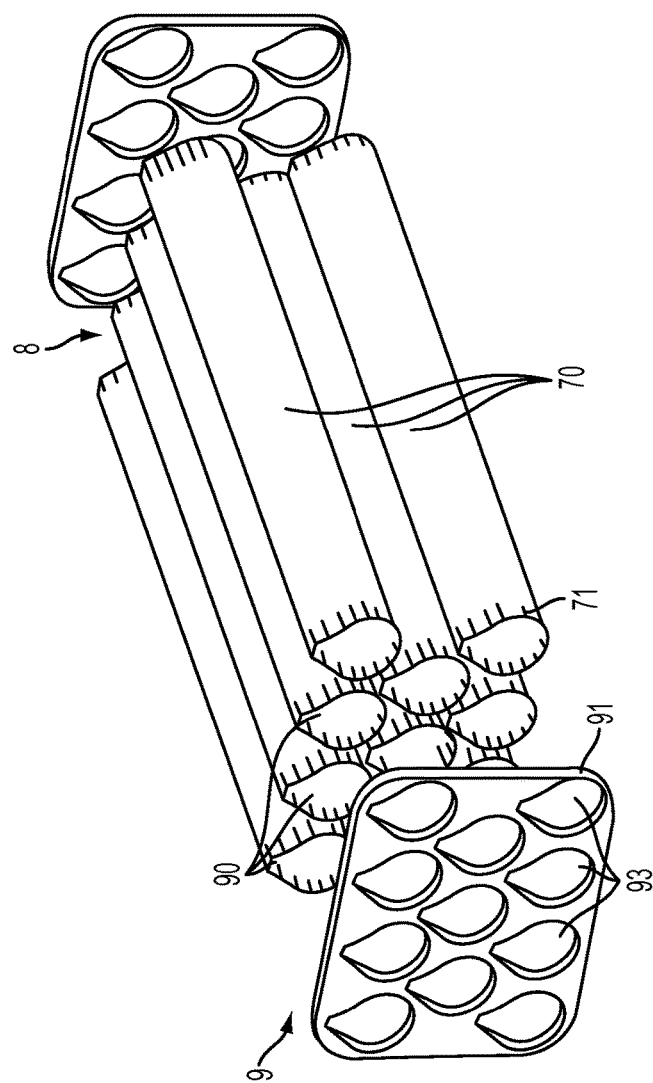
FIG. 2 is an exploded isometric view of the internal launch tube and bulkhead assembly of FIG. 1.

With reference to FIGS. 1 and 2, a launch tube assembly 1 is provided. The launch tube assembly 1 includes a housing 2, which has first (or rear) and second (or forward) opposite longitudinal ends 3 and 4, and a sidewall casing 5 that extends between the longitudinal ends 3 and 4 to define an interior 6 in which an array of launch tubes 7 is disposed. The array of launch tubes 7 includes a plurality of tubular elements 70 that are arrayed in a predefined matrix format and are respectively supported in the first longitudinal end 3 by an aft bulkhead assembly 8 and in the second longitudinal end 4 by a forward bulkhead assembly 9.

The first longitudinal end 3 may include a first plate 30, which is disposed at a distance from the aft bulkhead assembly 8. The first plate 30 is formed to define a plurality of first apertures 31 in positions that are respectively aligned with corresponding ones of the plurality of tubular elements 70. The first longitudinal end 3 may further include a plurality of first aperture covers 32 respectively disposed at corresponding ones of the first apertures 31. The second longitudinal end 4 may include a second plate 40, which is disposed at a distance from the forward bulkhead assembly 9. The second plate 40 is formed to define a plurality of second apertures 41 in positions that are respectively aligned with corresponding ones of the plurality of tubular elements 70. The second longitudinal end 4 may further include a plurality of second aperture covers 42 respectively disposed at corresponding ones of the second apertures 41.

In an operation of the launch tube assembly 1, ordinance may be loaded into each of the tubular elements 70 by way of the first aperture 31. The first aperture covers 32 are installed at the first apertures 31 once the ordinance is loaded into the tubular elements 70. The ordinance may be launched through the second apertures 42, which are removed prior to launch sequence. In accordance with embodiments, the ordinance may include various types of missile or other similar kinetic or guidance aircraft.

With continued reference to FIGS. 1 and 2 and with additional reference to FIGS. 3-7, it will be understood that the aft bulkhead assembly 8 and the forward bulkhead assembly 9 may be configured substantially similarly. Thus, while the following description relates generally to the structure of the forward bulkhead assembly 9 and additional description of the aft bulkhead assembly 8 will be omitted, the following description can apply to both sections.

As shown in FIG. 2, in particular, the forward bulkhead assembly 9 includes multiple tube-to-bulkhead joints 90. Each of these joints 90 includes a local portion of a bulkhead 91, a proximal end 71 of a corresponding one of tubular elements 70 and adhesive 92 (see FIGS. 5 and 7). The bulkhead 91 is formed to define bulkhead apertures 93 and includes interior facing sidewalls 94 (see FIGS. 5 and 7) at each of the bulkhead apertures 93. The bulkhead apertures 93 are formed in positions that are respectively aligned with corresponding ones of the tubular elements 70 and the second apertures 41. The interior facing sidewalls 94 may have a length that is equal to and reflective of a thickness of the bulkhead 91.

Each of the tubular elements 70 is respectively insertible into a corresponding one of the bulkhead apertures 93 at corresponding ones of the joints 90. As such, each of the tubular elements 70 includes the proximal end 71 that is both sized to fit into the corresponding one of the bulkhead apertures 92 and slotted (see FIGS. 3 and 6, for example). The slotting of the proximal end 71 forms multiple slots 710 at multiple cross-sectional locations in the proximal end 71 and these slots 710 form multiple deflectable fingers 711 at the proximal end 71. The adhesive 92 is disposable between at least the multiple deflectable fingers 711 of each tubular element 70 and the interior facing sidewalls 94 of the each of the corresponding ones of the bulkhead apertures 93.

Figure 5:
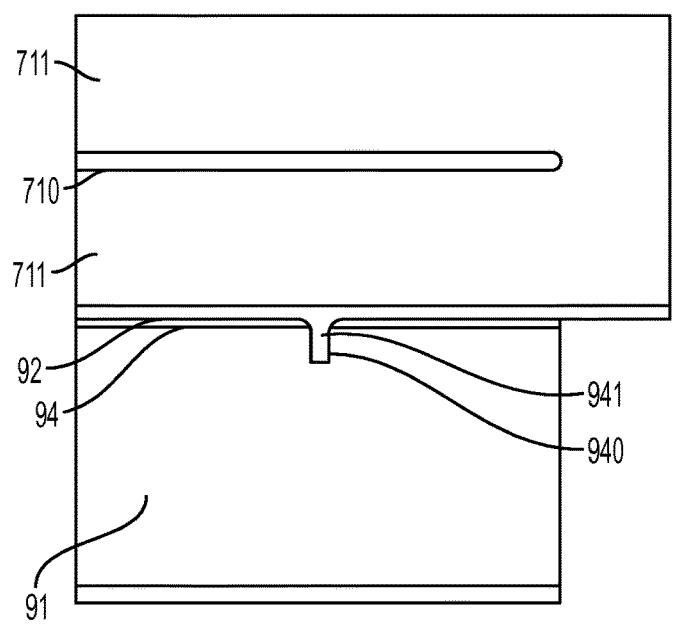
FIG. 5 is a sectioned side view of the end of the tubular element of FIG. 3 in a bulkhead aperture.
Figure 7:
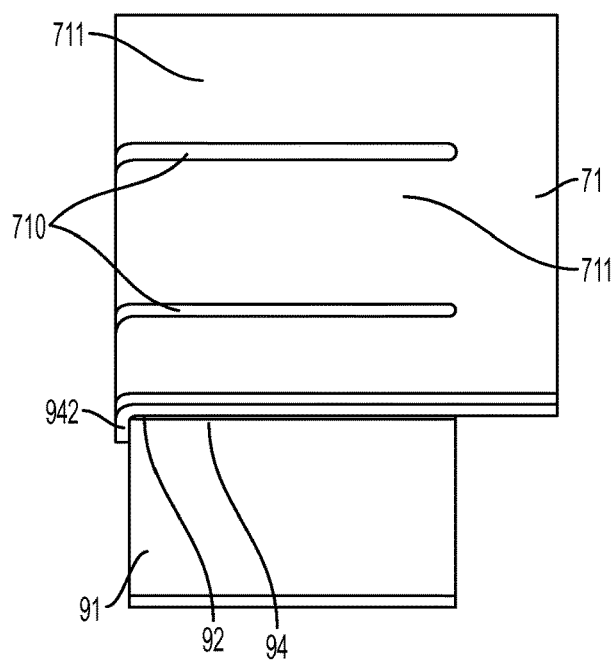
FIG. 7 is a sectioned side view of the end of the tubular element of FIG. 6 in a bulkhead aperture.

As shown in FIGS. 5 and 7, the slots 710 may be at least as long as the thickness of the bulkhead 91 and may be, but are not required to be, oriented in parallel with a longitudinal axis of the tubular element 70. With their length being at least as long as the thickness, the slots 710 permit modest deflections of each of the multiple deflectable fingers 711 about deflection axes that extend between interior ends of pairs of adjacent slots 710 as well as visual verification that an appropriate amount of adhesive 92 is present in the joint 90. The orientation of the slots 710 in parallel with a longitudinal axis of the tubular element 70 insures that adjacent ones of the multiple deflectable fingers 711 will not interfere with each other when they are modestly deflected.

In accordance with alternative embodiments, the slots 710 may be shorter than the thickness of the bulkhead 91 depending on joint requirements.

Figure 3:
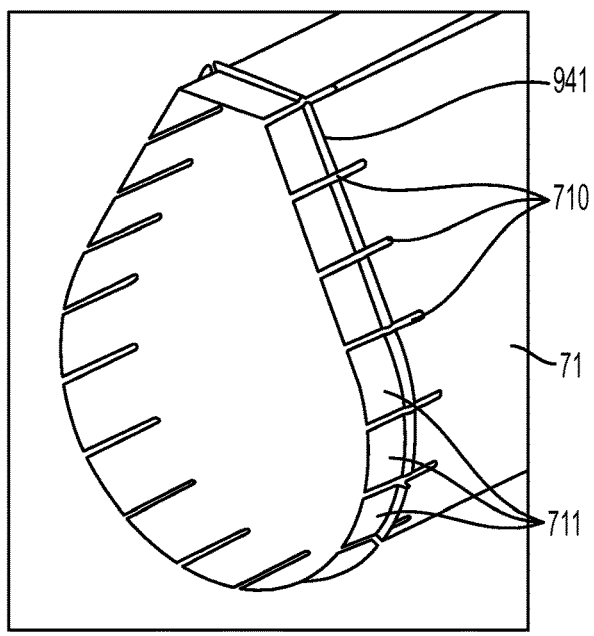
FIG. 3 is an isometric view of an end of a tubular element in accordance with embodiments.
Figure 6:
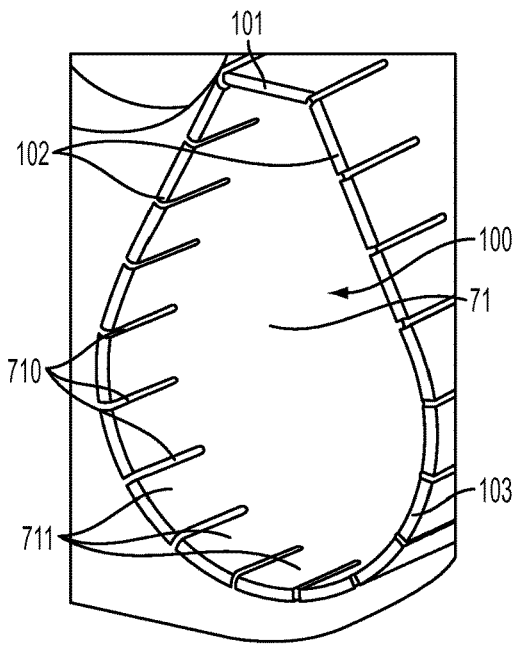
FIG. 6 is an isometric view of an end of a tubular element in accordance with further embodiments.

In accordance with embodiments and, as shown in FIGS. 3 and 6, the bulkhead apertures 93 and the tubular elements 70 may have an angular teardrop shape 100. This angular teardrop shape is characterized in cross-section as having a planar end 101, proximal sides 102 that taper away from the planar end 101 and a bulbous end 103. The bulbous end 103 extends from terminals of the proximal sides 102 and may be provided with an angular, hemispherical shape. The angular teardrop shape 100 may extend along an entirety of the tubular elements 70 to provide for an interior suited for housing of ordinance. Of course, it is to be understood that the angular teardrop shape 100 is exemplary and that any shape is possible in view of ordinance requirements.

Figure 4:
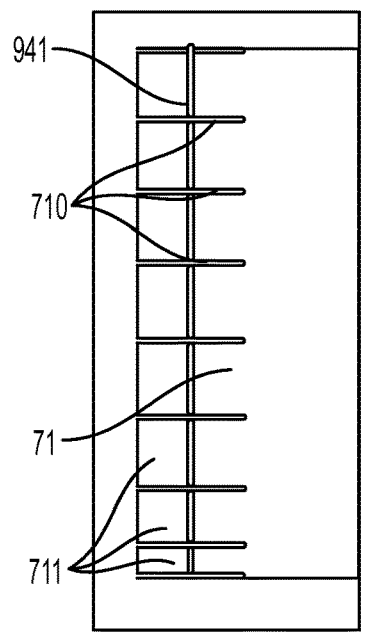
FIG. 4 is a side view of the end of the tubular element of FIG. 3.

As shown in FIGS. 3-5, the interior facing sidewalls 94 of each of the bulkhead apertures 93 may define a recess 940. This recess 940 can be localized to a predefined cross-sectional location or may extend around an entirety of the interior facing sidewall 94. In the former case, a central flange 941 of a deflectable finger 711 of the corresponding tubular element 70 is insertible into the recess 940 to aid in axially locating the tubular element 70 with respect to the bulkhead 91 and to increase a bond area of the joint 90. In the latter case, central flanges 941 of each of the multiple deflectable fingers 711 of the corresponding tubular element 70 are insertible into the recess 940 to aid in axially locating the tubular element 70 with respect to the bulkhead 91 and to increase a bond area of the joint 90.

As shown in FIGS. 6 and 7, an end flange 942 of a deflectable finger 711 of a tubular element 70 may be disposed to abut an axial surface of the bulkhead 91 to aid in axially locating the tubular element 70 with respect to the bulkhead 91 by impeding further insertion and to increase a bond area of the joint 90. Alternatively, end flanges 942 of each of the multiple deflectable fingers 711 of the tubular element 70 may be disposed to abut with the axial surface of the bulkhead 91 to aid in axially locating the tubular element 70 with respect to the bulkhead 91 by impeding further insertion and to increase a bond area of the joint 90.

Figure 8A:
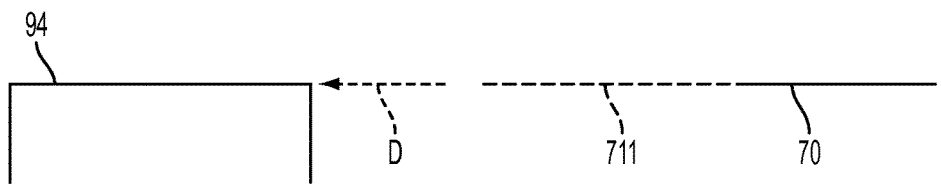
FIG. 8A is a schematic diagram of an insertion of a tubular element into a bulkhead opening at an initial stage in accordance with embodiments.
Figure 8B:
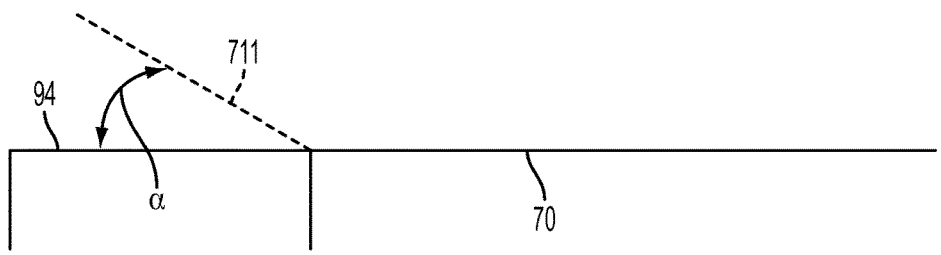
FIG. 8B is a schematic diagram of an insertion of a tubular element into a bulkhead opening at an intermediate stage in accordance with embodiments.
Figure 8C:
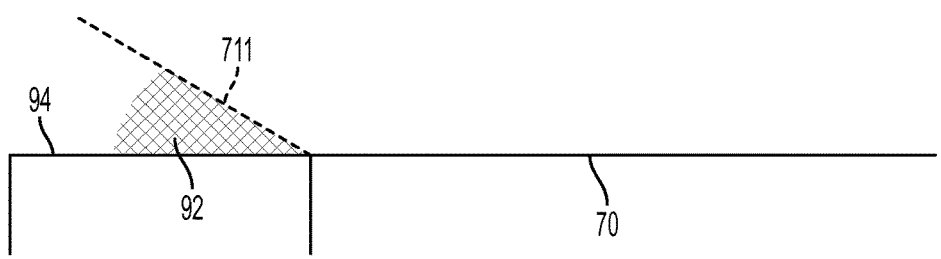
FIG. 8C is a schematic diagram of an insertion of a tubular element into a bulkhead opening at an intermediate stage in accordance with embodiments.
Figure 8D:
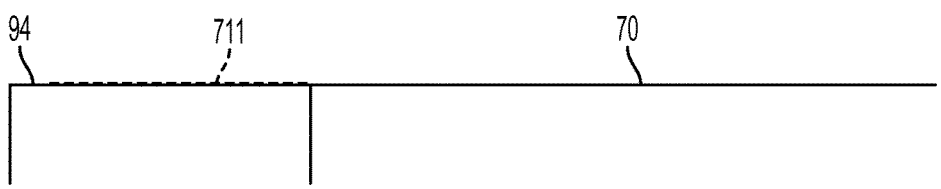
FIG. 8D is a schematic diagram of an insertion of a tubular element into a bulkhead opening at a later stage in accordance with embodiments.

With reference to FIGS. 8A-8D, an insertion process for inserting a tubular element 70 into a bulkhead aperture 93 to form the joint 90 (i.e., a tube-to-bulkhead joint) will now be described. As shown in FIG. 8A, the tubular element 70 is moved toward the bulkhead aperture 93 in the insertion direction D with the local deflectable finger 711 aligned generally with the local portion of the interior facing surface 94 and the sidewalls of the tubular element 70. Then, as the tubular element 70 enters into the bulkhead aperture 93, the deflectable finger 711 may be modestly deflected, as shown in FIG. 8B. This modest deflection allows the deflectable finger 711 form an angle a with the sidewalls of the tubular element 70 so that continued insertion can be conducted without impediment and so that adhesive 92 can be injected into the region bounded by the local portion of the interior facing surface 94 and the deflectable finger 711, as shown in FIG. 8C. Finally, the deflectable finger 711 is re-deflected back toward the local portion of the interior facing surface 94, as shown in FIG. 8D, whereupon the adhesive 92 can be cured and the formation of the joint 90 completed.

With the structures described above, formation of a relatively low-risk, low-cost bond joint 90 that can be verified by visual inspection is made possible for various material and bond joint geometry combinations. In addition, the approaches described herein could be used with a number of different materials and bond joint geometry combinations that would not be limited to composites and/or certain cross-sectional shapes.

Although the description provided herein focuses on the applicability of the gluing of a tube inside a close tolerance hole in missile launcher/canister technologies, it is to be understood that this focus was done for clarity and brevity and that the structures and processes are applicable to other areas of technology as well. For example, the description provided herein is applicable to missile launcher/canister technology, rocket motor-to-end plate joints, composite missile body-to-metallic ring or section joints and/or to replacement parts for injection grids on wind turbine blades.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The described embodiments were chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A tube-to-bulkhead joint, comprising:
a bulkhead defining an aperture and comprising an interior facing sidewall at the aperture, the interior facing sidewall of the bulkhead at the aperture being configured to face radially inwardly;
a tubular element, which is insertible into the aperture, the tubular element comprising an end sized to fit into the aperture and slotted to form multiple deflectable fingers,
each of the multiple deflectable fingers comprising a face, which faces radially outwardly at the aperture; and
adhesive disposable along a radial dimension between the face, which faces radially outwardly at the aperture, of each of the multiple deflectable fingers and the radially inwardly facing interior facing sidewall of the bulkhead at the aperture,
wherein the aperture and the tubular element have an angular teardrop shape comprising a planar end, proximal sides extending with a taper away from terminals of the planar side and a bulbous end extending away from terminals of the proximal sides to form an angular hemispherical shape.

2. The joint according to claim 1, wherein the end of the tubular element is slotted in multiple cross-sectional locations.

3. The joint according to claim 2, wherein each slot is at least as long as a thickness of the bulkhead.

4. The joint according to claim 2, wherein each slot is shorter than a thickness of the bulkhead.

5. The joint according to claim 1, wherein the end of the tubular element is slotted along a longitudinal axis thereof.

6. The joint according to claim 1, wherein a deflectable finger comprises an end flange disposed to abut with an axial surface of the bulkhead.

7. The joint according to claim 1, wherein each of the multiple deflectable fingers comprises an end flange disposed to abut with an axial surface of the bulkhead.

8. A tube-to-bulkhead joint, comprising:
a bulkhead defining an aperture and comprising an interior facing sidewall at the aperture, the interior facing sidewall of the bulkhead at the aperture being configured to face radially inwardly;
a tubular element, which is insertible into the aperture, the tubular element comprising an end sized to fit into the aperture and slotted to form multiple deflectable fingers,
each of the multiple deflectable fingers comprising a face, which faces radially outwardly at the aperture; and
adhesive disposable along a radial dimension between the face, which faces radially outwardly at the aperture, of each of the multiple deflectable fingers and the radially inwardly facing interior facing sidewall of the bulkhead at the aperture,
wherein the interior facing sidewall defines a recess into which a central flange of a deflectable finger is insertible.

9. A tube-to-bulkhead joint, comprising:
a bulkhead defining an aperture and comprising an interior facing sidewall at the aperture, the interior facing sidewall of the bulkhead at the aperture being configured to face radially inwardly;
a tubular element, which is insertible into the aperture, the tubular element comprising an end sized to fit into the aperture and slotted to form multiple deflectable fingers,
each of the multiple deflectable fingers comprising a face, which faces radially outwardly at the aperture; and
adhesive disposable along a radial dimension between the face, which faces radially outwardly at the aperture, of each of the multiple deflectable fingers and the radially inwardly facing interior facing sidewall of the bulkhead at the aperture,
wherein the interior facing sidewall defines a recess into which central flanges of each of the multiple deflectable fingers are insertible.

10. A tube-to-bulkhead joint, comprising:
a bulkhead defining apertures and comprising radially interior facing sidewalls at each of the apertures, each of the interior facing sidewalls of the bulkhead at the aperture being configured to face radially inwardly;

tubular elements which respectively comprise a tubular sidewall and an end inserted and sized to fit into the corresponding aperture, the end of each tubular element being slotted to form multiple deflectable fingers which are initially aligned in parallel with the tubular sidewall, inwardly deflected during end insertion into the aperture and outwardly deflected for re-alignment in parallel with the tubular sidewall following the end insertion into the aperture, each of the multiple deflectable fingers comprising a face, which faces radially outwardly at the aperture; and adhesive disposed along a radial dimension between the face, which faces radially outwardly at the aperture, of each of the multiple deflectable fingers of each tubular element and the radially inwardly facing interior facing sidewalls of the bulkhead at each of the corresponding apertures upon inward deflections of the multiple deflectable fingers and cured upon outward deflections and re-alignments of the multiple deflectable fingers, wherein the apertures and the tubular elements have an angular teardrop shape for facilitating ordinance reception within the tubular element comprising a planar end proximal sides extending with a taper away from terminals of the planar side and a bulbous end extending away from terminals of the proximal sides to form an angular hemispherical shape.

11. The joint according to claim 10, wherein the end of each of the tubular elements is slotted in multiple cross-sectional locations.

12. The joint according to claim 11, wherein each slot is at least as long as a thickness of the bulkhead.

13. The joint according to claim 11, wherein each slot is shorter than a thickness of the bulkhead.

14. The joint according to claim 10, wherein the end of each of the tubular elements is slotted along a longitudinal axis thereof.

15. The joint according to claim 10, wherein a deflectable finger of a tubular element comprises an end flange disposed to abut with an axial surface of the bulkhead by the outward deflection of the deflectable finger.

16. The joint according to claim 10, wherein each of the multiple deflectable fingers of a tubular element comprises an end flange disposed to abut with an axial surface of the bulkhead by the outward deflections of the multiple deflectable fingers.

17. A tube-to-bulkhead joint, comprising:

a bulkhead defining apertures and comprising radially interior facing sidewalls at each of the apertures;

tubular elements which respectively comprise a tubular sidewall and an end inserted and sized to fit into the corresponding aperture, the end of each tubular element being slotted to form multiple deflectable fingers which are initially aligned in parallel with the tubular sidewall, inwardly deflected during end insertion into the aperture and outwardly deflected for re-alignment in parallel with the tubular sidewall following the end insertion into the aperture; and adhesive disposed between the multiple deflectable fingers of each tubular element and the interior facing sidewalls of the each of the corresponding apertures upon inward deflections of the multiple deflectable fingers and cured upon outward deflections and re-alignments of the multiple deflectable fingers, wherein the interior facing sidewalls of each of the apertures defines a recess into which a central flange of a deflectable finger of the corresponding tubular element is inserted by the outward deflection of the deflectable finger.

18. A tube-to-bulkhead joint, comprising:

a bulkhead defining apertures and comprising radially interior facing sidewalls at each of the apertures;

tubular elements which respectively comprise a tubular sidewall and an end inserted and sized to fit into the corresponding aperture, the end of each tubular element being slotted to form multiple deflectable fingers which are initially aligned in parallel with the tubular sidewall, inwardly deflected during end insertion into the aperture and outwardly deflected for re-alignment in parallel with the tubular sidewall following the end insertion into the aperture; and adhesive disposed between the multiple deflectable fingers of each tubular element and the interior facing sidewalls of the each of the corresponding apertures upon inward deflections of the multiple deflectable fingers and cured upon outward deflections and re-alignments of the multiple deflectable fingers, wherein the interior facing sidewalls of each of the apertures defines a recess into which central flanges of each of the multiple deflectable fingers of the corresponding tubular element are inserted by the outward deflections of the multiple deflectable fingers.

19. A method of forming a tube-to-bulkhead joint, the method comprising:

defining an aperture in a bulkhead such that an interior facing sidewall of the bulkhead at the aperture faces radially inwardly;

sizing an end of a tubular element to fit into the aperture;

slotting the end of the tubular element to form multiple deflectable fingers which are initially aligned in parallel with a sidewall of the tubular element, each of the multiple deflectable fingers comprising a face, which faces radially outwardly at the aperture;

inwardly deflecting the multiple deflectable fingers during an insertion of the end of the tubular element into the aperture;

disposing adhesive along a radial dimension between the face, which faces radially outwardly at the aperture, of each of the multiple deflectable fingers having been inwardly deflected and the radially inwardly facing interior facing sidewall of the bulkhead at the aperture;

outwardly deflecting the multiple deflectable fingers to be re-aligned in parallel with the sidewall of the tubular element such that central flanges of each of the multiple deflectable fingers are inserted into a recess of the interior facing sidewall; and curing the adhesive remaining between the multiple deflectable fingers having been outwardly deflected and the interior facing sidewall of the aperture.

20. The method according to claim 19, further comprising axially locating the end of the tubular element within the aperture.

* * * * *